United States Patent [19]

Batchelor

[11] Patent Number: 4,520,785
[45] Date of Patent: Jun. 4, 1985

[54] GASEOUS FUEL SUPPLY AND CONTROL SYSTEM FOR AN INTERNAL COMBUSTION ENGINE

[75] Inventor: William H. Batchelor, Jensen Beach, Fla.

[73] Assignee: Propane Carburetion Systems, Inc., Stuart, Fla.

[21] Appl. No.: 575,776

[22] Filed: Feb. 1, 1984

[51] Int. Cl.³ .............................................. F02M 21/02
[52] U.S. Cl. .............................. 123/525; 123/27 GE; 123/575
[58] Field of Search .......... 123/525, 527, 575, 27 GE; 48/189.1

[56] References Cited

U.S. PATENT DOCUMENTS

| | | | |
|---|---|---|---|
| 2,311,315 | 2/1943 | Smith | 123/527 |
| 2,908,258 | 10/1959 | Schwalter et al. | 123/27 GE |
| 2,994,187 | 8/1961 | Kelgard | 123/27 GE |
| 4,031,864 | 6/1977 | Crothers | 123/575 |
| 4,440,137 | 4/1984 | Lagano et al. | 123/27 GE |

FOREIGN PATENT DOCUMENTS 153933  9/1982  Japan .................................... 123/525

*Primary Examiner*—E. Rollins Cross
*Attorney, Agent, or Firm*—Bacon & Thomas

[57] ABSTRACT

A control system for an auxiliary gaseous fuel supply system for an internal combustion engine utilizing a primary liquid fuel supply includes a pressure regulator that is controlled by two pressure signals generated in response to engine operating conditions to enable the pressure regulator to respond more rapidly to changes in engine operating conditions. A valve in the pressure regulator is controlled by a diaphragm subjected on its opposite sides to a pair of pressure signals, one of the signals corresponding to the usual long term gas fuel demand signal which primarily controls the position of the regulator valve, the other signal corresponding to shorter term changes in intake air flow conditions in the intake air duct of the engine to augment or oppose the primary signal, depending upon instantaneous intake air flow conditions. A modulator valve blocks the secondary, short term control signal under conditions of full power demand on the engine, to enable the primary signal to effect total regulator valve control.

11 Claims, 6 Drawing Figures

GASEOUS FUEL SUPPLY AND CONTROL SYSTEM FOR AN INTERNAL COMBUSTION ENGINE

BACKGROUND OF THE INVENTION

1. Field of the Invention

This invention relates to internal combustion engines, and in particular supplemental gaseous fuel supply and control system for such an engine using a liquid primary fuel.

2. Description of the Prior Art

The present invention is concerned wth an auxiliary or supplemental gaseous fuel supply and control system for an internal combustion engine utilizing a liquid fuel as a primary fuel source. For example, this invention finds application in connection with a diesel engine which is primarily supplied with diesel fuel during its operation, but which can be arranged to operate on both liquid and gaseous fuel while achieving substantially the same power output during its operation. Thus, this invention finds application in dual fuel supply systems for internal combustion engines wherein a supplemental gaseous fuel such as propane or natural gas (or any other fuel that can be supplied in gaseous form to an engine intake airstream) is provided to the intake air of an engine in conjunction with reduced amounts of its normal liquid fuel supply to obtain more economical operation of the engine under circumstances where the operational cost using the supplemental gaseous fuel is less than the cost of using the liquid fuel alone.

In the prior art, it is conventional to supply a gaseous fuel to the intake airstream of an internal combustion engine either alone or in combination with a liquid fuel. In typical gaseous fuel supply systems, a high pressure source of the normally gaseous fuel, which may be in liquid or highly compressed form at the supply source, is heated and vaporized in a vaporizer/pressure regulator device and then supplied to a suitable mixer valve in the intake air duct of an engine for admixture with the intake air in suitable proportions consistent with the fuel and power requirements of the engine. Examples of patents disclosing supplemental gas fuel supply systems for liquid fuel engines, such as diesel engines, include U.S. Pat. Nos. 2,781,030, 2,928,382 and 3,443,551. Furthermore, examples of mixing valves for supplying the gasoue fuel to the engine intake airstream are disclosed in U.S. Pat. Nos. 2,150,764, 2,311,315 and 3,948,224.

The problem intended to be solved by the invention is the slow response time of the typical pressure regulator valve that is located between the gaseous fuel supply source and the mixer valve at the intake duct of the engine, and also the tendency for intake air pressure signals to be inappropriate where an exhaust gas driven supercharger is provided in the intake air duct downstream of the gas fuel mixer valve. Since a typical installation involves running lengths of conduit between the gaseous fuel supply, the pressure regulator and the mixer valve, and since the pressure regulator is normally governed by a vacuum pressure signal originating at the mixer valve within the intake duct, there has been observed substantial delay in the response time of the pressure regulator, particularly in the environment of a diesel engine having an exhaust driven supercharger (turbocharger) used to pressurize the intake airstream. The delay is particularly severe when the rate of flow of the airstream suddenly decreases during a deceleration condition of the engine, resulting in oversupply of the gaseous fuel momentarily to the intake stream and the resulting waste of gaseous fuel. The problem is exacerbated by the fact that it is highly desirable to promote rapid opening of the pressure regulator valve when the rate of flow of the intake airstream is rapidly increasing and to also obtain rapid closing the regulator valve when the intake airstream flow rate rapidly decreases. However, it has been observed that it is more desirable for the rate of opening of the valve to be slower than the rate of closing of the valve, and that it is also highly desirable to fully open the pressure regulator valve when maximum engine power is demanded.

SUMMARY OF THE INVENTION

This invention relates to a control system for the pressure regulator valve in a gaseous fuel supply system for an internal combustion engine, particularly a diesel engine. A pressure regulator valve that is normally controlled by a suction pressure signal received from a mixer valve in the air intake duct of an internal combustion engine is further regulated in response to a secondary pressure signal generated in the intake duct so that the final position of the regulator valve, at least on a short term basis, is determined not only by the primary suction signal, but also by the secondary pressure signal. The pressure signals result in movement of the pressure regulator valve in such a manner that, when full power of the engine is called for by the speed governor of the engine, the secondary pressure signal is blocked from the pressure regulator so that only the primary signal is operative on the pressure regulator valve. However, under reduced power demand conditions, the secondary pressure signal is supplied to the regulator valve to cooperate with the primary pressure signal to produce a final regulator valve position that is rapidly and accurately responsive to sudden changes in intake air velocity in the air intake duct of the engine. Moreover, this invention contemplates a special venting arrangement for the pressure regulator valve that enables the regulator valve to respond more rapidly to the primary pressure signal in a closing direction as compared with motion in a valve opening direction. This produces increased economy and smoothness of operation of the regulator valve.

DETAILED DESCRIPTION OF THE PREFERRED EMBODIMENT

Figure 1:
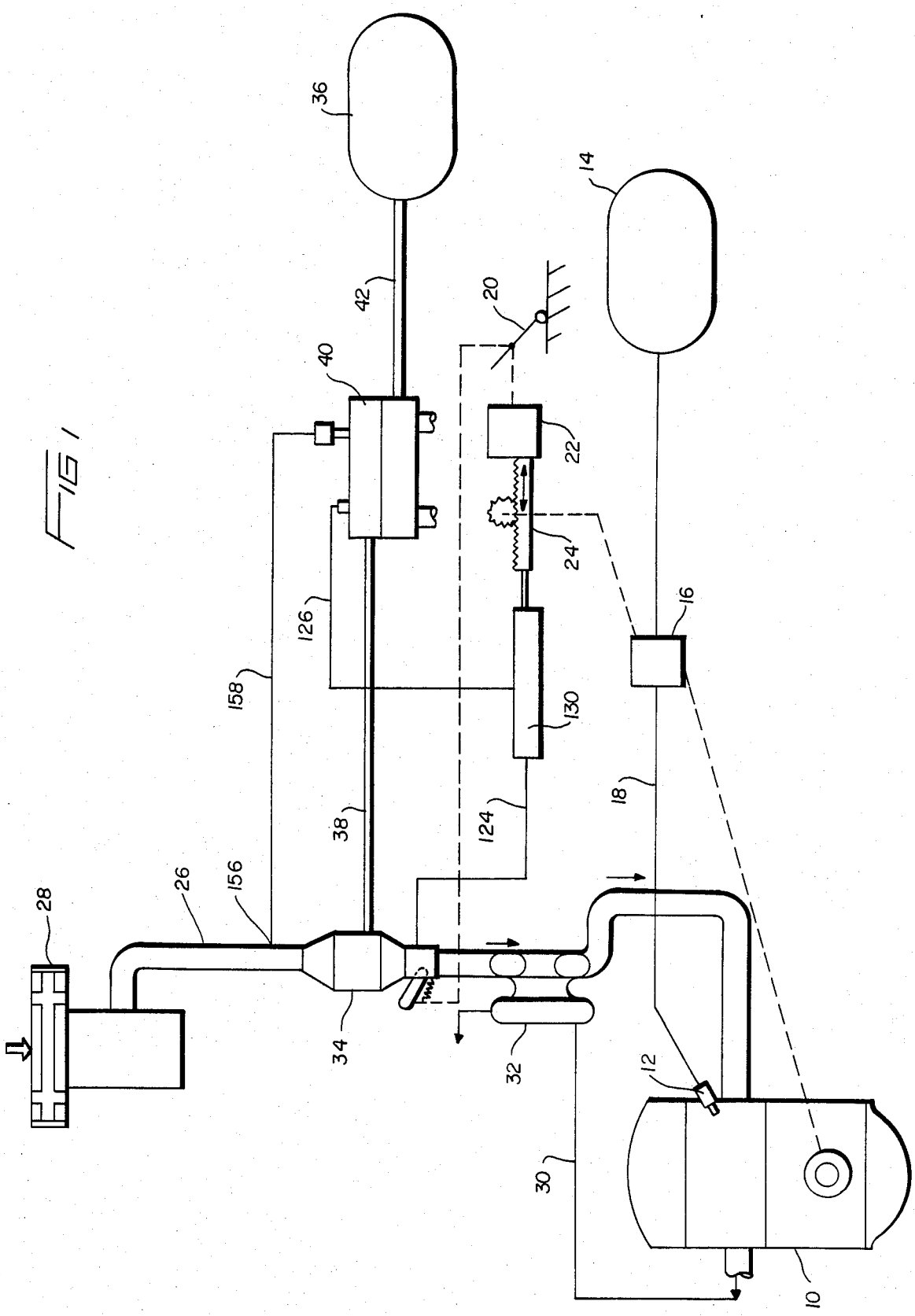
FIG. 1 is a schematic illustration of a dual fuel supply system for a diesel engine having an exhaust driven intake air supercharger.

With reference to FIG. 1, an internal combustion engine 10, in this instance a diesel engine, is supplied with diesel fuel through injectors 12 from primary liquid fuel supply source 14 through a suitable injector pump 16 via conduit 18. The speed of the engine is regulated by an operator by movement of an accelerator pedal 20 which supplies the speed or power input demand signal to a governor 22 having a movable rack or other element 24 that moves in response to engine power demand to control the output of injector pump 16.

Intake air for combustion is supplied to engine 10 through intake air conduit 26 which, at its entrance, is provided with a suitable air filter 28. Exhaust from the engine 10 is conducted away from the engine via exhaust duct 30 which is connected to an exhaust driven supercharger 32 which pressurizes intake air supplied to engine 10.

Engine 10 is also supplied with a supplemental gaseous fuel such as propane, natural gas or other appropriate gas fuel, by means of a mixer valve 34 in intake air conduit 26 upstream of the supercharger 32. Gaseous fuel is supplied to the mixer valve 34 from a high pressure gas fuel supply source 36 vis conduit 38.

Figure 3:
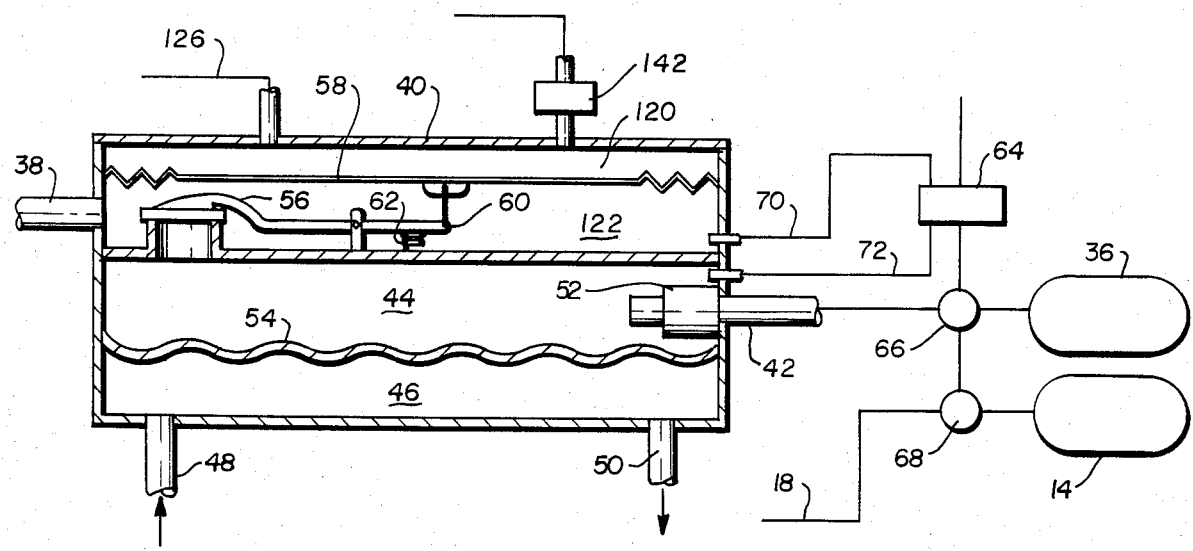
FIG. 3 is a schematic illustration of a vaporizer/pressure regulator for the gaseous fuel supplied to the engine of FIG. 1.

A vaporizer/pressure regulator valve 40 is provided in the gaseous fuel supply system between the regulator valve 36 and the mixer valve 34. As illustrated in FIG. 3, the vaporizer/pressure regulator valve receives high pressure gaseous fuel from supply line 42 within the lower vaporizer chamber 44, which is in heat exchange relationship with engine coolant circulated through chamber 46 and conduits 48-50, which are in communication with the coolant circulation system of engine 10. A first stage pressure reduction valve 52 reduces the pressure of the gaseous fuel as it enters chamber 44, wherein the fuel is heated and vaporized by heat exchange contact with the bottom wall 54 of the chamber which is in direct contact with hot engine coolant circulated through the bottom chamber 46 of the vaporizer/pressure regulator 40.

A secondary pressure regulator valve 56 constituting an outlet port for the chamber 44 is provided within the vaporizer/pressure regulator housing 40 and is controlled by a diaphragm actuator 58 via linkage 60, whereby differential pressure applied to opposite sides of the diaphragm 58 effect its movement upwardly or downwardly as viewed in FIG. 3 to control the position of the regulator valve 56. As shown in FIG. 3, downward movement of diaphragm 58 will cause opening of valve 56, while upward movement of the diaphragm will cause closing of the valve 56. The valve 56 is normally maintained in a closed position due to the upward bias of spring 62. A separate system including a solenoid valve 64 which actuates supply valves 66, 68 does not constitute part of the present invention, but it used to shut off the supply of high pressure gaseous fuel from source 36 and to convert the system exclusively to a liquid fuel supply system from source 14 when the pressure of the gaseous fuel supply drops below a preset minimum as determined by pressure sensor lines 70, 72.

Figure 2:
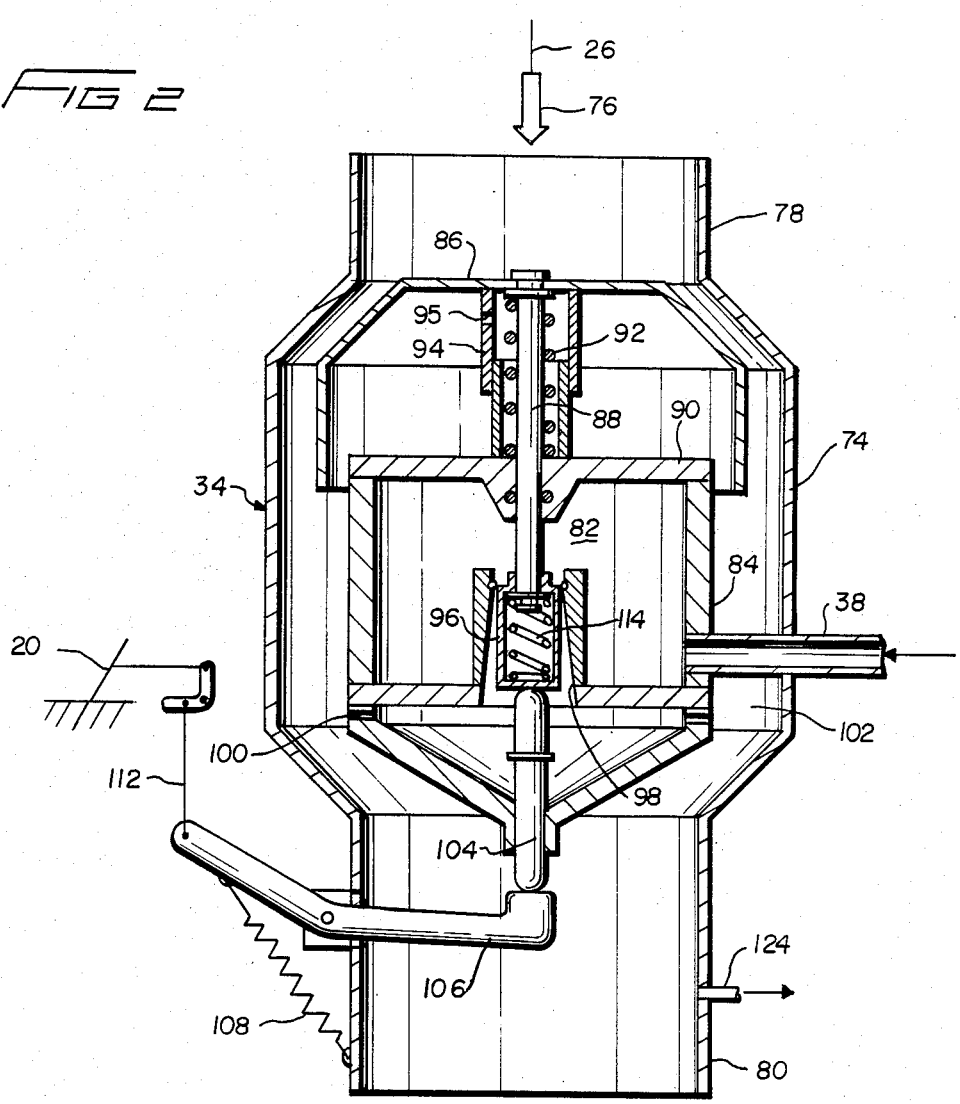
FIG. 2 shows a specific embodiment of a gaseous fuel mixer in the intake duct of the engine illustrated in FIG. 1.

The mixer valve 34 is shown in more detail in FIG. 2, wherein the valve is seen to comprise a housing 74 through which all the intake air supplied to engine 10 flows, as indicated by arrow 76. The housing 74 has an inlet end 78, an outlet end 80 and a gas fuel supply conduit 38 extending through housing 74 into an interior volume of the valve.

Within the housing 74, there is provided a central gas fuel manifold chamber 82 that is in communication with the gaseous fuel supply conduit 38, the chamber 82 being defined by the walls of an inner housing 84 that is centrally supported within the outer mixer valve housing 74 by suitable structure that does not impair the flow of intake air through the housing. An air flow reaction member 86 is supported by a valve actuator rod 88 that extends vertically through and is supported by the upper wall 90 of chamber 84. The air reaction member 86 is normally biased upward towards a duct restricting position by means of a spring 92, and a motion damper 94 in the form of a pair of telescopic elements defining therebetween a variable volume chamber is provided to dampen motion of air flow reaction member 86. A vent orifice 95 controls the flow of air into and out of the variable interior volume of the damper when the reaction member 86 moves vertically as shown in FIG. 2 in response to the flow of air in the direction of arrow 76 through conduit 26 and valve housing 74. Movement of the air flow reaction member is thus proportional to the velocity of air moving through the air intake duct of the engine and the movement of the reaction member is directly transmitted to the valve actuator rod 88. Motion of the air flow reaction member 86 is resisted by spring 92 and the rate of its motion is controlled by the design parameters of the damper 94.

Flow of gaseous fuel from manifold 82 into the moving intake airstream flowing through the valve housing 74 is controlled by the position of the mixer valve element 96, which is in the form of a reciprocating hollow plug element that moves linearly within valve port 98, which is a tapered opening in accordance with this embodiment. Progressive motion in a downward direction of valve element 96 as illustrated in FIG. 2 progressively opens the flow area through valve port 98 to admit a progressively greater amount of gaseous fuel into the intake airstream from manifold 82. Gaseous fuel flowing through port 98 exits through openings 100 in a lower chamber of inner housing 84 into a low pressure region 102 within housing 74 that is constricted somewhat as compared with the remaining flow area through the housing to produce a primary suction pressure that is proportional to the rate of flow of air moving through the intake air conduit 26. This primary pressure signal is communicated upstream through the gaseous fuel supply conduit 38 to the lower side of the diaphragm actuator 58 (see FIG. 3) to control the position of the pressure regulator valve 56. Thus, when the absolute pressure at the reduced pressure zone 102 in mixer valve 34 drops in response to increased rate of intake air flow, a primary suction pressure signal is generated in conduit 38 to cause regulator valve 56 to progressively open to supply increasing amounts of gaseous fuel to the gas fuel manifold in valve 34. Conversely, reduced velocity of intake air through mixer valve housing 74 causes the air reaction member 86 to move upwardly in response to the bias of spring 92 with a simultaneous reduction of pressure in the low pressure area 102 of the mixer valve housing, so that the progressive closing of the valve element 96 reduces the flow of gaseous fuel 82 into the intake airstream.

In this embodiment, the mixer valve element 96 is not directly connected to actuator rod 88, but rather is joined to the rod by a lost motion connection that permits relative downward motion of rod 88 relative to the valve element 96 when the air reaction member moves downwardly in response to air flow through the housing 74. The lost motion connection enables the valve element 96 to be restrained against motion in a closed position by a plunger 104 that is maintained in an elevated position by a pivoted arm 106 connected to a spring 108 that biases the arm 106 in a direction tending to hold the plunger 104 in an upward position whereat valve element 96 is held at a closed position. A control linkage 112 connected to the accelerator peddle 20 is arranged so that the arm 106 is maintained in the position illustrated when the accelerator pedal is in the idle or start engine position. As accelerator pedal is moved away from idle position to demand increased engine speed, the linkage 112 is moved to pull the left end of arm 106 upwardly to cause downward movement of the opposite end of the arm in engagement with plunger 104 to cause progressive opening of port 98 of the valve by permitting downward movement of the valve element 96. The downward movement of the valve element 96 results from the compression of compression spring 114 within valve element 96 that extends between the bottom wall of the valve element and the bottom of the actuator rod 88. Thus, if plunger 104 is in the upper position, motion of air flow reaction member 86 is unimpeded due to the lost motion connection between the actuator rod 88 and the valve element 96. However, if air is flowing through the air intake duct to engine 10, the spring 114 will be compressed by the downward movement of actuator rod 88 so as to bias the valve element 96 towards an opening direction. When accelerator 20 is moved away from its idle position, movement of the valve element 96 will be permitted to progressively open the valve port 98 until, when the plunger 104 is at its fully lowered position, valve element 96 will follow movement of actuator rod 88 precisely. Accordingly, full flow of diesel fuel alone is assured upon start up of engine 10 and during idle conditions without interfering with the supply of air through the intake air conduit 26, while regulation of gaseous fuel flow from manifold 82 into the intake airstream is precisely regulated by motion of the valve element 96 and air reaction member 86 under all other conditions. Upward motion of rod 88, of course, positively drives the valve element 96 towards a closed position due to the enlargement at the bottom of the actuator rod contacting the inner top side of the valve element.

With reference to FIG. 3, it will be noted that the diaphragm actuator 58 actually separates two variable volume pressure chambers 120, 122, so that upward movement of the diaphragm 58 reduces the volume of upper pressure chamber 120, while downward movement reduces the volume of lower pressure chamber 122, which is in direct communication with conduit 38 which communicates the primary suction pressure signal to the diaphragm 58. Pressure chambers 120, 122 in effect are sealed chambers, except for the various inlets and outlets illustrated that are in communication with the respective chambers. It will be apparent that if upper chamber 120 is placed in communication with the difference source of absolute pressure, the end position of diaphragm 58, and likewise the position of regulator valve 56, will be determined by the balance achieved between the pressures in chambers 120 and 122. It is an objective of this invention to communicate a suitable pressure signal to the upper chamber 120 of the pressure regulator valve to thereby exert a secondary influence on the position of the regulator valve 56 in response to certain conditions within the air intake duct 26 that are manifested under different operating conditions of engine 10.

As shown in FIG. 1, a path of communication for a pressure signal is defined by open conduits 124, 126 leading from the mixer valve 34 to the upper chamber 120. The source of the pressure signal is shown in FIG. 2 as a region below the inner housing 84 and, as shown in FIG. 1, upstream of the supercharger 32. This region of the air intake duct is sensitive to rapid changes in intake air velocity that can occur for various reasons during operation of engine 10. If desired, the source of the secondary pressure signal in conduit 124 can be located closer to the supercharger or any other suitable position that will generate a desired absolute pressure signal responsive to the rate of air flow in intake air conduit 26.

Figure 4:
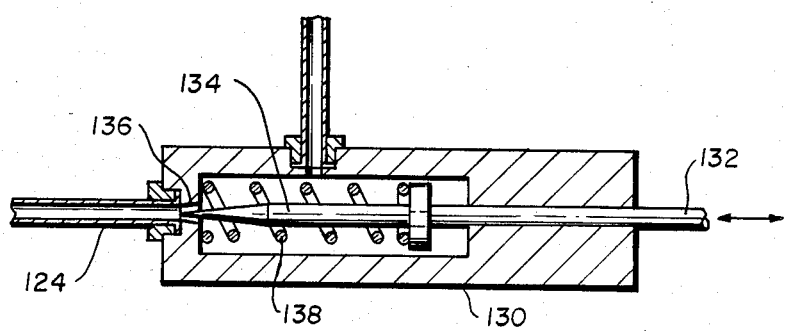
FIG. 4 illustrates the pressure modulator for the secondary pressure signal controlling the pressure regulator shown in FIG. 3.

As shown in FIGS. 1 and 4, a modulator valve 130 is interposed between conduits 124, 126 which communicate the secondary pressure signal to upper pressure chamber 120 of the vaporizer/pressure regulator 40. The modulator valve 130 is arranged to control communication between the mixer valve 34 (or any other source of the secondary pressure signal) and the upper pressure chamber 120 in the vaporizer/pressure regulator so that the signal is modulated in response to various engine operating conditions.

Referring to FIG. 4, it will be seen that the modulator valve 130 includes an input control link 132 that is connected to the governor rack 24 (or any other movable element that is displaced in response to engine speed or power demand) for movement therewith. In this example, leftward movement or rack 24 is towards a "speed increasing" position so that, upon the rack 24 reaching its maximum speed or power demand position towards the left, a needle valve 134 closes a port 136 at the terminal end of conduit 124. Closure of port 136 by needle valve 134 prevents communication of the secondary pressure signal to the upper side of diaphragm 58 so that the influence of the secondary pressure signal in conduit 124 is entirely negated when the governor 22 is demanding maximum fuel flow and full engine power of engine 10. Conversely, when rack 24 moves towards a reduced power position (to the right in FIG. 1), compression spring 138 moves the needle valve 134 away from port 136 (assuming there is a lost motion connection between link 132 and rack 24) or, if link 132 is directly connected to rack 24, the needle valve 134 is directly moved towards the right away from the port 136 during reduced power engine operating conditions. Movement of the needle valve 134 away from orifice 136 progressively permits communication between the source of the secondary pressure signal in conduit 124 and the pressure chamber 120 above the diaphragm 58 (FIG. 3) so that influence of the secondary pressure signal is progressively exerted against the diaphragm 58 to achieve a balance with the primary suction pressure signal communicated to chamber 122 below diaphragm 58 through conduit 38.

Since the chamber 120 in effect is a sealed chamber except for conduit 126, movement of the diaphragm 58 will itself tend to cause a change in pressure in the chamber 120 if a suitable vent is not provided between chamber 120 and an ambient region. A suitable vent is illustrated at 142 in FIG. 3 and in more detail in FIGS. 5 and 6.

Vent 142 is in direct, proximate communication with upper pressure chamber 120 above the diaphragm 58, and includes a dual rate vent arrangement including an orifice plate 144 having a plurality of openings 146 therethrough that are normally obstructed by a resilient flapper valve 148 that is centrally retained against the orifice plate 144 by an apertured fastener 150. The fastener 150 includes a small opening 152 therethrough, the cross sectional area of which is considerably smaller than the total cross sectional flow area through openings 146 in the orifice plate 144. The flapper valve 148 is preferably made of resilient material such as rubber or plastic, whereby it is readily yieldable in an upward direction away from orifice plate 144 when the pressure below the orifice plate is greater than the pressure above the orifice plate. The upper region 154 of the vent 142 is vented to an ambient or reference pressure zone 156 (see FIG. 1) in intake air conduit 26 downstream of air cleaner 28 and upstream of mixer valve 34 via line 158.

Figure 5:
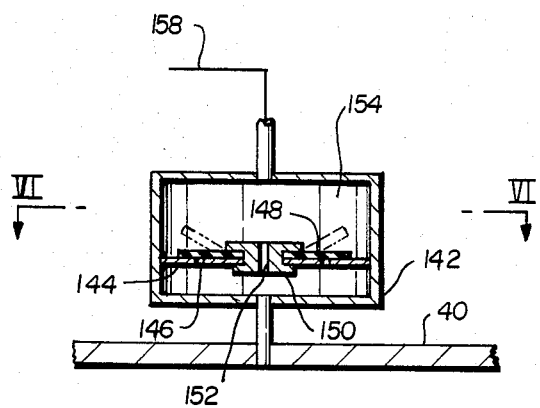
FIG. 5 illustrates a vent for the upper chamber of the pressure regulator shown in FIG. 3.
Figure 6:
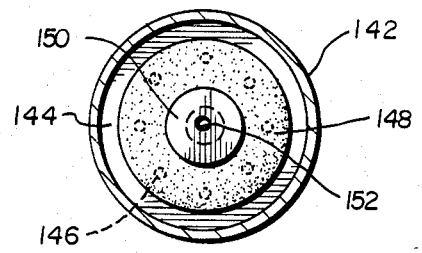
FIG. 6 is a view taken along line VI—VI of FIG. 5.

The vent 142 is thereby capable of venting pressure from upper pressure chamber 120 above diaphragm 58 in the vaporizer/pressure regulator 40 more rapidly in an outward direction than in an inward direction. Venting in an outward direction occurs through all the openings 146 in the orifice plate 144 due to the easy displacement of the flapper valve 148 upwardly as shown in FIG. 5, while inward venting into chamber 120 is slower, since the only cross sectional flow area for venting air is through restricted opening 152 in the fastener 150 due to closure of flapper valve 148 over the openings 146. This enables further control to be exerted over the secondary pressure signal applied to chamber 120 to the extent that increase of pressure in chamber 120 is vented more rapidly than a decrease of pressure in such chamber so that closure of pressure regulator valve 56 is normally more rapid and instantaneous in response to a secondary pressure signal applied to chamber 120 than opening of the regulator valve. This is highly desirable to stabilize operation of the regulator valve 56 and to achieve economies not previously obtainable under rapidly changing conditions affecting the rate of flow of intake air supplied to engine 10 through the intake air conduit 26. Ultimately, of course, the primary suction pressure signal in conduit 38 prevails, while the secondary pressure signal communicated through conduit 126 exerts shorter term temporary adjustments in response to rapidly changing conditions in the intake air duct. Under maximum power demand conditions, the primary suction pressure signal in conduit 38 exerts the sole influence on the regulator valve 56, while under reduced power conditions, the secondary pressure signal is permitted to exert its short term influence on the position of the regulator valve 56.

It will be apparent that various modifications to the preferred embodiment can be made by a person skilled in the art without departing from the scope of the invention as defined in the claims below.

What is claimed is:

1. In a control system for a dual fuel supply system for an internal combustion engine including a primary liquid fuel supply, a high pressure secondary gas fuel supply, an air intake duct for the engine, a power controller for the engine including a power demand element movable in proportion to engine power demand, means for supplying the gas fuel to a first region of the intake air duct in proportion to the supply of liquid fuel to the engine, and a pressure regulator including a movable regulator valve for controlling the supply of gas fuel to said first region at a reduced, regulated pressure, the regulator valve controlled by a primary absolute pressure signal generated in response to intake duct flow conditions at said first region of said duct, the improvement comprising:

means for sensing and generating a secondary absolute pressure signal responsive to intake air flow rate in the intake duct at a second region different from the first region;

means for transmitting the secondary pressure signal to the pressure regulator;

means for modulating the secondary pressure signal in response to movement of said engine power demand element so that the pressure signal is blocked upstream of the pressure regulator when the engine power demand element is at a full power position and is progressively released to communicate with the pressure regulator as the element moves away from the full power position towards a reduced power position;

means in the pressure regulator for influencing the movement of the regulator valve in response to said secondary pressure signal;

the final position of the regulator valve being determined by the balance of the influences exerted by the primary and secondary pressure signals.

2. In a control system as claimed in claim 1, the system including an engine exhaust-driven turbocharger for pressurizing intake air in the intake duct downstream of the first region where the gas fuel is admitted, the improvement further comprising:

the location of said second region being between said first region and said turbocharger.

3. In a control system as claimed in claim 1, the improvement further comprising:

said means for modulating the secondary pressure signal comprising a variable size air flow orifice that is adjustable in size in response to motion of said engine power demand element.

4. In a control system as claimed in claim 1, the improvement further comprising:

said pressure regulator valve having a differential pressure responsive driving member for adjusting its position, said driving member in communication with two differential pressure chambers within the pressure regulating valve; means for communicating said primary suction pressure signal and said secondary pressure signal respectively to one of said differential pressure chambers, so that the position of the pressure regulator valve is determined by the net force resulting from the influence of said pressure signals on said driving member.

5. In a control system as claimed in claim 1, the improvement further comprising:

a variable flow vent between the differential pressure region receiving said secondary pressure signal and a reference pressure zone, said differential pressure responsive member comprising a movable diaphragm, and said differential pressure chambers comprising variable volume pressure chambers disposed on opposite sides of the diaphragm, the volume of said regions being varied by movement of the diaphragm.

6. In a control system as claimed in claim 5, the improvement further comprising:

an air cleaner between atmosphere and said intake duct; said reference pressure zone located in the intake duct between said air cleaner and said first region where said gaseous fuel is admitted to the intake air.

7. The improvement in a control system as claimed in claim 5, the improvement further comprising:

said driving member arranged to respond to said primary and secondary absolute pressure signals by moving the regulator valve towards a closed position when the primary pressure signal reflects a lower absolute pressure than said secondary signal in the differential pressure chambers.

8. The improvement in a control system as claimed in claim 1, the improvement further comprising a movable mixing valve in the intake duct for supplying the gas fuel to the intake air in the duct at said first region of the duct, said primary absolute pressure signal being generated in said mixer valve.

9. A method of controlling a pressure regulator valve governing the pressure of a gas fuel supply to an internal combustion engine having a movable engine power demand element, the engine having an air intake duct to which the gas fuel is supplied, and in which duct primary and secondary absolute pressure signals responsive to rate of flow of intake air are generated, the primary signal responsive to a first absolute pressure condition in a first region of the intake duct, the secondary signal responsive to secondary absolute pressure conditions in a second region of the intake duct, the pressure regulator valve including a differential pressure responsive valve actuator that normally opens the valve in response to decreasing absolute pressure conditions in the first region of the duct, or increased flow rate in said region, comprising:

supplying the primary pressure signal to one pressure side of the valve actuator;

supplying the secondary pressure signal to the opposed pressure side of the valve actuator;

modulating the secondary pressure signal by varying the communication of same between the intake duct and the pressure regulator valve actuator in response to the position of the engine power demand element so that said secondary pressure signal is entirely blocked when the power demand element is at its full power position to thereby cancel the influence of the secondary pressure signal on the regulator valve, and also so that communication of same to the pressure regulator valve actuator is progressively permitted as the power demand element moves away from the full power position towards a partial power position.

10. A method as claimed in claim 9, the valve actuator comprising a movable diaphragm between variable volume primary and secondary pressure chambers to which said primary and secondary pressure signals are directly communicated by conduits, the volume of said secondary chamber being variable in respect to motion of said diaphragm, comprising:

venting said secondary pressure chamber to a reference pressure zone when its volume is influenced by the diaphragm, the rate of venting being faster when the volume of the chamber is reduced as compared to the venting rate when the volume of the chamber is increased;

whereby the rate of movement of the valve actuator is faster in a valve closing direction then in a valve opening direction.

11. A method as claimed in claim 8, wherein the gas fuel is supplied to the air intake duct via a mixer valve in the air intake duct, including generating the primary absolute pressure signal within the mixer valve, and the secondary absolute pressure signal at a location downstream of said mixer valve in the intake duct.

* * * * *